United States Patent [19]

Ozaki et al.

[11] Patent Number: 5,331,425
[45] Date of Patent: Jul. 19, 1994

[54] IMAGE DATA ENCODING APPARATUS PROVIDING INCREASED ENCODING EFFICIENCY WITH REDUCED DEPENDENCY ON IMAGE CONTENT

[75] Inventors: Tohru Ozaki, Tokyo; Hitoshi Horie, Ageo; Hideyuki Shirai, Ichikawa, all of Japan

[73] Assignee: Matsushita Graphic Communication Systems, Inc., Tokyo, Japan

[21] Appl. No.: 818,572

[22] Filed: Jan. 9, 1992

[30] Foreign Application Priority Data

Jan. 14, 1991 [JP] Japan ............................ 3-2669

[51] Int. Cl.⁵ .............................................. H04N 1/41
[52] U.S. Cl. ...................................... 358/426; 358/427
[58] Field of Search .............. 358/261.1, 261.2, 261.4, 358/426, 427, 429, 456; 382/56; H04N 1/41, 1/419

[56] References Cited

U.S. PATENT DOCUMENTS

| | | | |
|---|---|---|---|
| 4,706,127 | 11/1987 | Nobuta | 358/486 |
| 4,805,135 | 2/1989 | Ochi et al. | 358/426 |
| 5,168,374 | 12/1992 | Morimoto | 358/426 |
| 5,181,126 | 1/1993 | Morimoto | 358/426 |

OTHER PUBLICATIONS

"Standardization of Group 3 Facsimile Apparatus for Document Transmission", Geneva, 1980, amended at Malaga-Torremolinos, 1984 and Melbourne, 1988, CCITT Recommendation T.4, pp. 21 to 47.

Primary Examiner—Edward L. Coles, Sr.
Assistant Examiner—Kim Yen Vu
Attorney, Agent, or Firm—Lowe, Price, LeBlanc & Becker

[57] ABSTRACT

A data encoding apparatus, applicable for example to a facsimile apparatus, increases the degree of image data compression that can be achieved by a variable length encoding scheme, by limiting the maximum amount of data outputted from the encoding apparatus for each scan line to the amount of unencoded image data in a scan line. Generation of increased amounts of data in the case of certain types of image content, as a result of the variable length encoding, is thereby eliminated with a consequent increase in encoding efficiency.

9 Claims, 5 Drawing Sheets

FIG. 1

CODE TABLE (MH ENCODING)

| WHITE RUN LENGTH | ENCODED DATA | NO. OF BITS | BLACK RUN LENGTH | ENCODED DATA | NO. OF BITS |
|---|---|---|---|---|---|
| □× 0 | 0 0 1 1 0 1 0 1 | 8 | ■× 0 | 0 0 0 0 1 1 0 1 1 1 | 10 |
| □× 1 | 0 0 0 1 1 1 | 6 | ■× 1 | 0 1 0 | 3 |
| □× 2 | 0 1 1 1 | 4 | ■× 2 | 1 1 | 2 |
| □× 3 | 1 0 0 0 | 4 | ■× 3 | 1 0 | 2 |
| □× 4 | 1 0 1 1 | 4 | ■× 4 | 0 1 1 | 3 |
| □× 5 | 1 1 0 0 | 4 | ■× 5 | 0 0 1 1 | 4 |
| □× 6 | 1 1 1 0 | 4 | ■× 6 | 0 0 1 0 | 4 |
| □× 7 | 1 1 1 1 | 4 | ■× 7 | 0 0 0 1 1 | 5 |
| □× 8 | 1 0 0 1 1 | 5 | ■× 8 | 0 0 0 1 0 1 | 6 |
| □× 9 | 1 0 1 0 0 | 5 | ■× 9 | 0 0 0 1 0 1 | 6 |
| □×10 | 0 0 1 1 1 | 5 | ■×10 | 0 0 0 0 1 0 0 | 7 |
| □×11 | 0 1 0 0 0 | 5 | ■×11 | 0 0 0 0 1 0 1 | 7 |
| □×12 | 0 0 1 0 0 0 | 6 | ■×12 | 0 0 0 0 1 1 1 | 7 |
| □×13 | 0 0 0 0 1 1 | 6 | ■×13 | 0 0 0 0 0 1 0 0 | 8 |
| □×14 | 1 1 0 1 0 0 | 6 | ■×14 | 0 0 0 0 0 1 1 1 | 8 |
| □×15 | 1 1 0 1 0 1 | 6 | ■×15 | 0 0 0 0 1 1 0 0 0 | 9 |
| □×16 | 1 0 1 0 1 0 | 6 | ■×16 | 0 0 0 0 0 1 0 1 1 1 | 10 |
| □×17 | 1 0 1 0 1 1 | 6 | ■×17 | 0 0 0 0 0 1 1 0 0 0 | 10 |
| □×18 | 0 1 0 0 1 1 1 | 7 | ■×18 | 0 0 0 0 0 0 1 0 0 0 | 10 |
| □×19 | 0 0 0 1 1 0 0 | 7 | ■×19 | 0 0 0 0 1 1 0 0 1 1 1 | 11 |
| □×20 | 0 0 0 1 0 0 0 | 7 | ■×20 | 0 0 0 0 1 1 0 1 0 0 0 | 11 |

IMAGE DATA ENCODING APPARATUS PROVIDING INCREASED ENCODING EFFICIENCY WITH REDUCED DEPENDENCY ON IMAGE CONTENT

BACKGROUND OF THE INVENTION

1. Field of Applicable Technology

The present invention relates to an image data encoding apparatus for converting image data to compressed form, for use in the data transmission section of a facsimile apparatus, etc. In particular, the invention relates to an image data encoding apparatus of the type in which increased encoding efficiency is achieved by a variable-length encoding method.

2. Description of the Related Art

With a prior art image data encoding apparatus of this type, image data derived by converting an original image to successive data values extending along successive scan lines (e.g. with the scan lines being horizontal and occurring successively along the vertical direction) are encoded using variable length code, e.g. a one-dimensional encoding arrangement such as the Modified Huffman (MH) code or a two-dimensional encoding arrangement such as the Modified Read (MR) code. The MH and MR codes are described in the CCITT Recommendation T.4 (pages 22 to 34), being designated therein as a one-dimensional run length coding scheme and a two-dimensional coding scheme respectively. In the following, for simplicity of description, it will be assumed that each data value of the image data is a single bit, representing one of two possible colors (e.g. the white or black states) of a bi-level picture element, with such a picture element being referred to as a dot. With such encoding, a variable-length code table of the form shown in FIG. 1 is utilized to obtain increased encoding efficiency. FIG. 1 is a code table for the MH encoding scheme mentioned above. In the image data that are to be encoded, a succession of dots which are the same color is referred to as a "run", and each run is encoded as a single predetermined code. For example, if there is a run of four successive white dots in the image data to be encoded, then that will be expressed by the code 1011 in the encoded data, whereas a run of four successive black dots will be expressed by the code 011. Such an encoding method generally provides compression of the amount of data which are outputted from the encoding apparatus, by comparison with the original image data, as is illustrated in the example of FIG. 2. In FIG. 2, an example is shown in which a run of 11 white dots is followed by a run of 3 black dots, with that sequence of 11 white dots and 3 black dots then again occurring, i.e. for a total of 28 bits in the original image data (the latter being referred to in the following as the raw data). Since each run of 11 white dots is expressed by the code 01000 (i.e. five bits) in the encoded data while each run of 3 black dots is expressed by the code 10 (i.e. two bits), it can be seen that the entire 28 bits of raw data can be converted to 14 bits of encoded data, so that the amount of data to be transmitted has been compressed by 14 bits.

Such a variable lengths encoding method however has the disadvantage that in the case of certain types of image, instead of achieving a compression of data by the encoding operation, the amount of encoded data may (at least in some of the scan lines) become substantially greater than the raw data expressing that image. An example of this will be described referring to FIG. 3. In this case, a portion of the raw data for an image is assumed to consist of five dots which are successively white, black, white, black and white, i.e. the run length in each case is 1. An isolated white dot (expressed in the raw data by one bit) is expressed in the encoded data by the code 000111, while a single black dot is encoded as 010. Hence as shown in FIG. 5, the five bits of raw data are expressed by a total of 24 bits in the encoded data, i.e. the amount of data has been increased by 19 bits. It can thus be understood that in the case of an image in which a number of isolated black and white dots occur along some of the scan lines, such a variable length encoding method may result in a considerable increase in the amount of encoded data that is generated for these scan lines, by comparison with the raw data for these scan lines. This is a basic disadvantage of such a prior art image data encoding apparatus.

SUMMARY OF THE INVENTION

It is an objective of the present invention to overcome the disadvantages of the prior art as set out by providing an image data encoding apparatus whereby conditions resulting in large increases in output data produced from the apparatus, depending upon the image contents, will not occur, so that a consistently high level of data compression efficiency is achieved.

Specifically with an image data encoding apparatus according to the present invention, variable length encoding of each scan line of image data is executed as described above, with the total amount of data constituting the encoded data for the scan line then being compared with a reference value which is substantially identical to the total amount of data in each scan line prior to encoding. If the amount of encoded data for the scan line does not exceed that reference value, then the encoded data for the scan line are outputted from the apparatus, whereas if the amount of encoded data exceeds that reference value then the unencoded image data (i.e. the raw data) for that scan line are outputted from the apparatus. In practice, it is necessary to identify each scan line which is outputted in unencoded form, by attaching a special code referred to in the following as an expansion code, so that the reference value is preferably established as the sum of the total amount of data for each scan line of the unencoded image data and the amount of data required to express the expansion code.

More specifically, the present invention provides an image data encoding apparatus for encoding input image data derived by converting an image to successive picture element data values along each of successive scan lines, comprising:

first memory means for receiving and temporarily storing said input image data;

encoding means for receiving said input image data from said first memory means, and for converting said input image data to encoded data;

second memory means for receiving and temporarily storing said encoded data;

data measurement means for receiving said encoded data from said second memory means and for computing a total amount of said encoded data for each of said scan lines;

comparator means for comparing each of said total amounts of encoded data with a predetermined reference value, said reference value being determined in accordance with a total amount of said input image data in each of said scan lines; and output selector means coupled to receive said input image data from said first memory means and said encoded data from said second memory means, and controlled by an output signal which is produced from said comparator means in accordance with results of said comparison, said output selector means selecting for each of said scan lines the encoded data for said scan line to be outputted therefrom if the total amount of said encoded data corresponding to said scan line does not exceed said reference value, and selecting the input image data for said scan line to be outputted therefrom if the total amount of said encoded data corresponding to said scan line does exceed said reference value.

Thus with an image data encoding apparatus according to the present invention it is always ensured that for each scan line of the image data, the amount of output data that is outputted from the apparatus for that scan line will not be significantly greater than the amount of raw image data for that scan line, irrespective of the contents of the image, i.e. it becomes impossible for the apparatus to introduce expansion of the amount of data that are outputted for any scan line, by comparison for the raw image data for the scan line.

BRIEF DESCRIPTION OF THE DRAWINGS

FIG. 1 shows a part of a MH variable length code table for use with an image data encoding apparatus;

DESCRIPTION OF PREFERRED EMBODIMENTS

Figure 2:
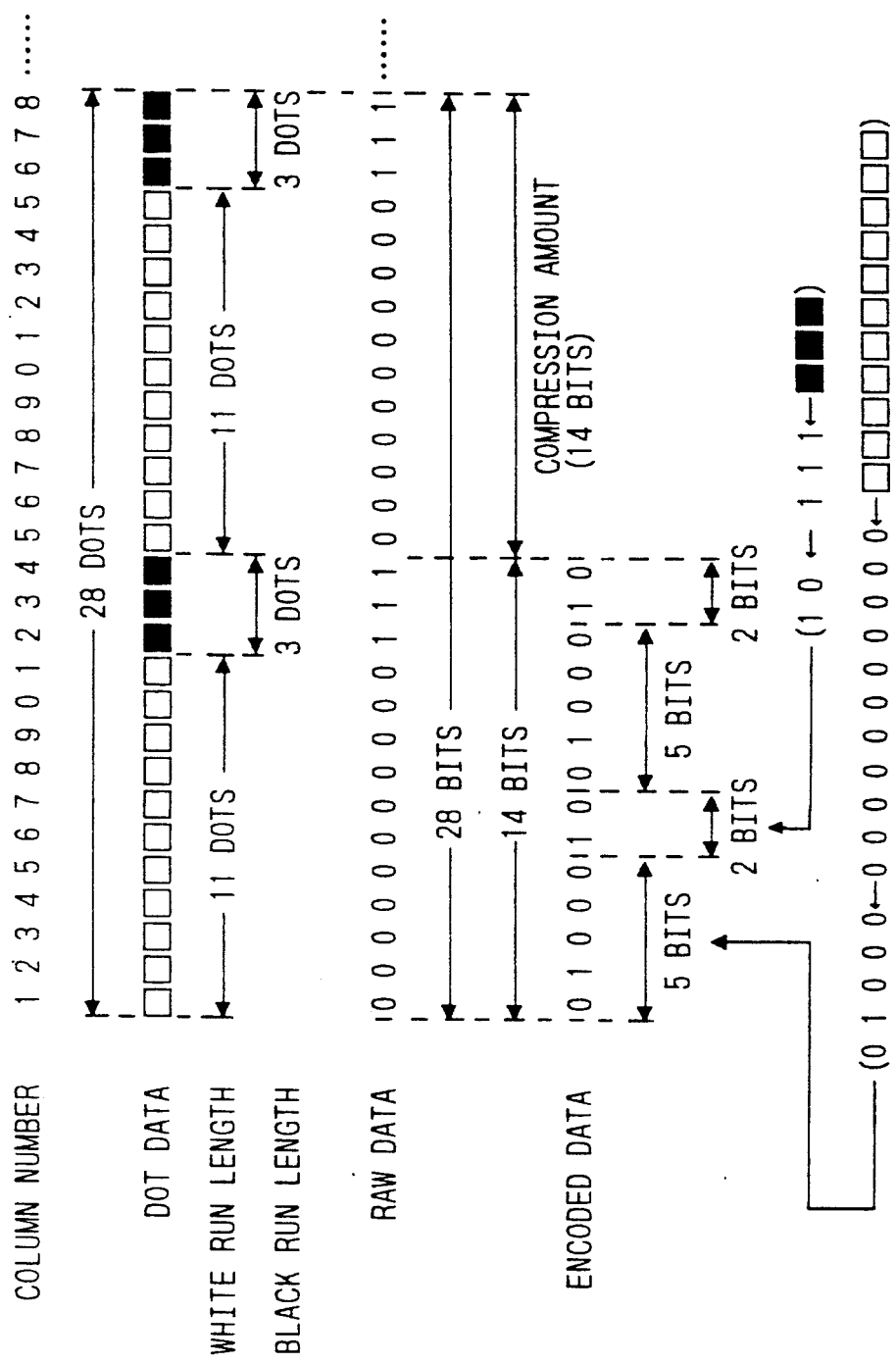
FIG. 2 shows a prior art encoding example using the table of FIG. 1.
Figure 3:
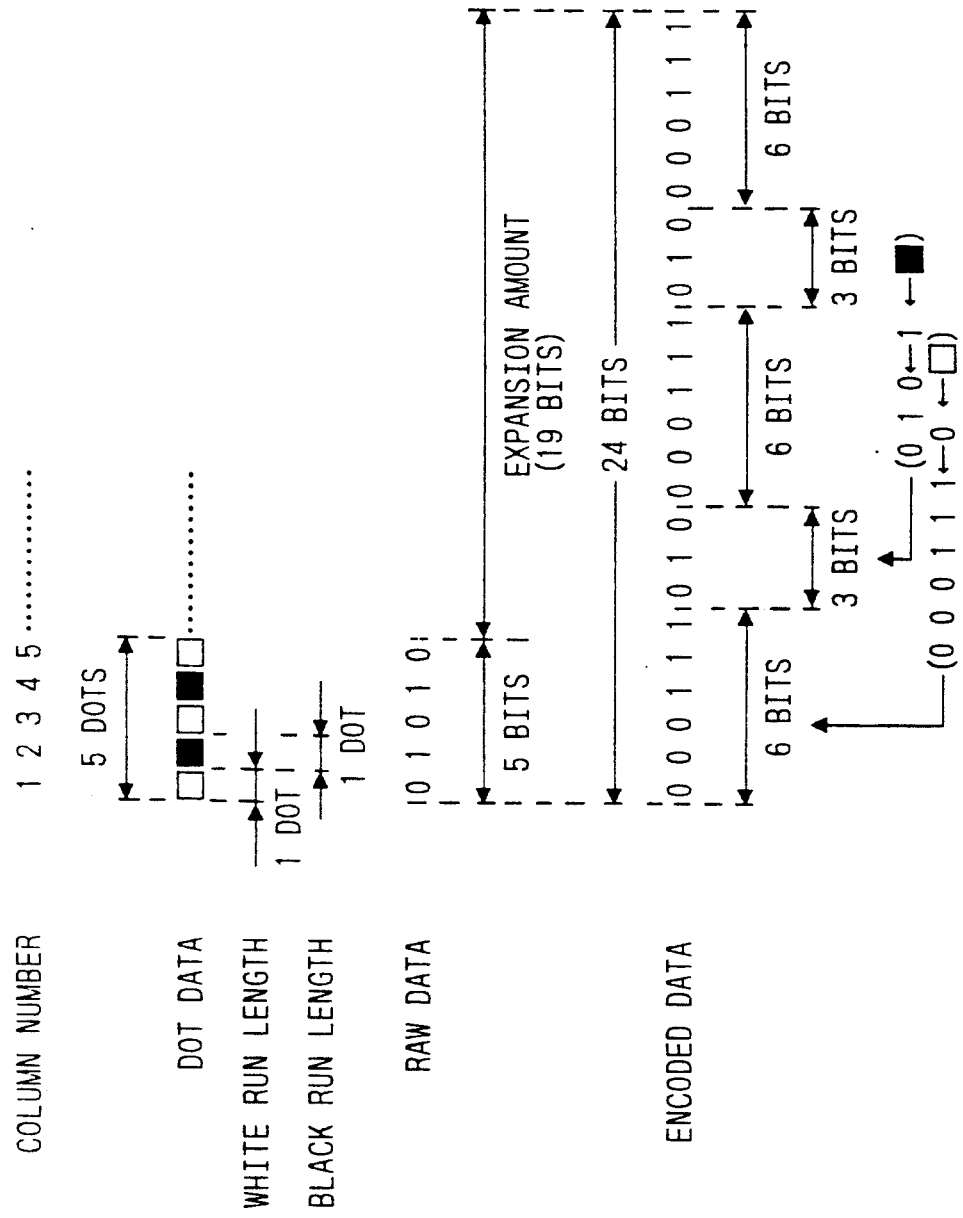
FIG. 3 shows a prior art encoding example using the table of FIG. 1, to illustrate a prior art problem.
Figure 4:
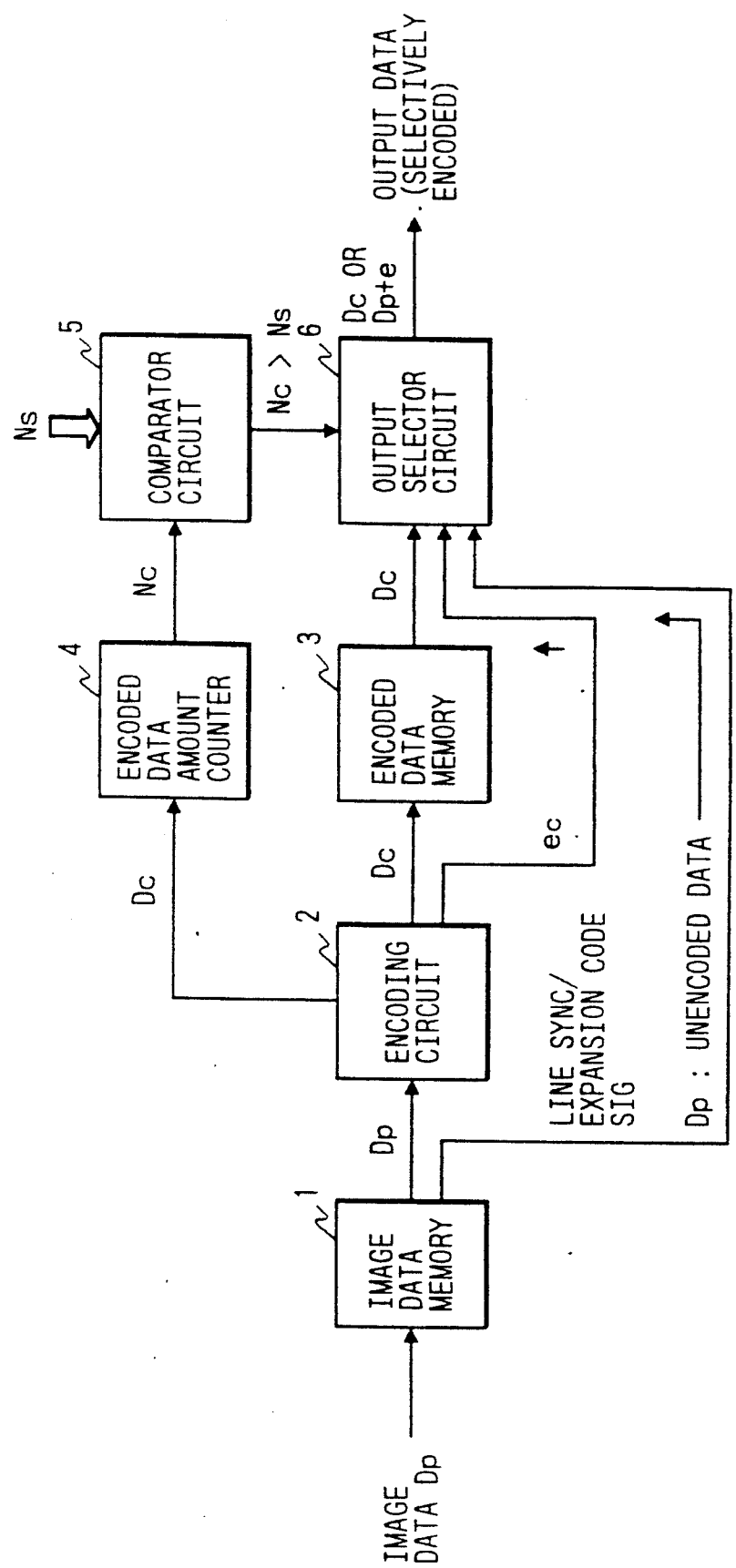
FIG. 4 is a general block diagram of an embodiment of an image data encoding apparatus according to the 20 present invention.

FIG. 4 is a general block diagram of an embodiment of an image data encoding apparatus according to the present invention, in which numeral 1 denotes an image data memory for temporarily storing image data Dp which have been generated as successive data values along successive scan lines of an image. In this embodiment it is assumed that each data value is one bit, i.e. that the data values represent respective bi-level (e.g. black or white) dot elements of the image. Numeral 2 denotes an encoding circuit coupled to receive image data Dp read out from the image data memory 1, for encoding that image data to obtain encoded data Dc by using a variable length encoding scheme. That will be assumed to be the MH encoding scheme described hereinabove with reference to the table of FIG. 1, however the MR 2-dimensional encoding scheme could equally well be used. An encoded data memory 3 temporarily stores the encoded data Dc read out from the encoding circuit 2. An encoded data amount counter circuit 4 also receives the encoded data Dc read out from the encoding circuit 2, and measures the amount of data Nc in the encoded data for each scan line, by counting the number of bits in that encoded data for each scan line. A comparison circuit 5 compares each data amount Nc for respective scan lines with a predetermined reference value Ns, where Ns is established as the sum of the number of bits in one scan line of the unencoded data Dp and the number of bits which express an expansion code $e_c$ (described hereinafter). An output selector circuit 6 is controlled by an output signal that is produced from the comparison circuit 5 in accordance with the results obtained by the comparison operations executed by the comparison circuit 5. Specifically, for each scan line, if the amount of encoded data Nc generated for that scan line exceeds the aforementioned reference value Ns, then the output selector circuit 6 is controlled to select the unencoded data Dp for that scan line to be read out from the image data memory 1 and outputted from the output selector circuit 6, with the expansion code $e_c$ attached thereto to identify that data as being unencoded. If however the amount of encoded data for a scan line does not exceed the reference value Ns then the encoded data Dc for that scan line are read out from the encoded data memory 3 and outputted from the output selector circuit 6.

More specifically, the operation of this image data encoding apparatus embodiment is as follows. Firstly, the encoding circuit 2 encodes the image data Dp (i.e. raw data) stored in the image data memory 1 by using the MH encoding scheme described hereinabove, i.e. using the code table shown in FIG. 1, whereby a single code is generated in the encoded data in correspondence with each run of bits which are of the same state in the raw data Dp, in accordance with the run length as described hereinabove. The resultant encoded data Dc are stored temporarily in the encoded data memory 3, and at the same time the amount of encoded data for each scan line is computed by the encoded data amount counter circuit 4. That is to say, as the encoded data for a scan line is written into the encoded data memory 3, an updated value Nc for the amount of that encoded data is derived by the encoded data amount counter circuit 4.

When a data amount Nc for a scan line has thus been obtained, and supplied from the encoded data amount counter circuit 4 to the comparison circuit 5, it is compared with the predetermined reference value Ns, i.e. the sum of the number of bits expressing one scan line in the unencoded image data Dp and the number of bits expressing the expansion code $e_c$. Assuming for example that the original image is of A4 size, having a width of 216 mm, and that the image is converted to image data with a picture element density of 8 dots/mm using bi-level conversion in which a black dot is expressed as a "1" state bit and a white dot as a "0" state bit, then each scan line of the image data Dp will consist of $(216 \times 8) = 1728$ bits. The expansion code $e_c$ is control data for indicating that unencoded data for a scan line are outputted from the apparatus, and is inserted immediately following the line synchronizing signal portion of the data for that scan line. The line synchronizing signal portion is (000000000001), and the expansion code $e_c$ can consist of a small number of bits, g lo of the form (000000000001xxx). It can thus be considered that the amount of data constituted by one scan line of the unencoded image data with the expansion code $e_c$ attached thereto is substantially the same as the amount of image data of one scan line.

If it is found as a result of the comparison executed by the comparison circuit 5, for a scan line, that the amount of the expansion code Dc generated by the encoding circuit 2 for that scan line does not exceed the reference value Ns, then that expansion code for the scan line is selected by the output selector circuit 6 to be read out from the encoded data memory 3 and outputted therefrom. If on the other hand the amount of expansion code Dc generated for a scan line is found to exceed the reference value Ns, then the unencoded image data Dp for that scan line is read out from the image data memory 1, the line synchronizing signal portion and the expansion code $e_c$ are attached thereto, and these data are outputted from the output selector circuit 6.

Figure 5A:
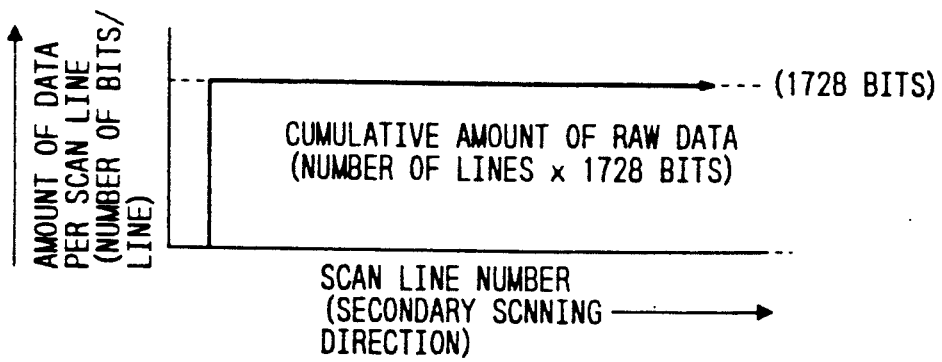
FIGS. 5(A)–5(C) show examples of output data amounts produced from a prior art image data encoding apparatus and from an image data encoding apparatus according to the present invention, as graphs of data amounts for successive scan lines.
Figure 5B:
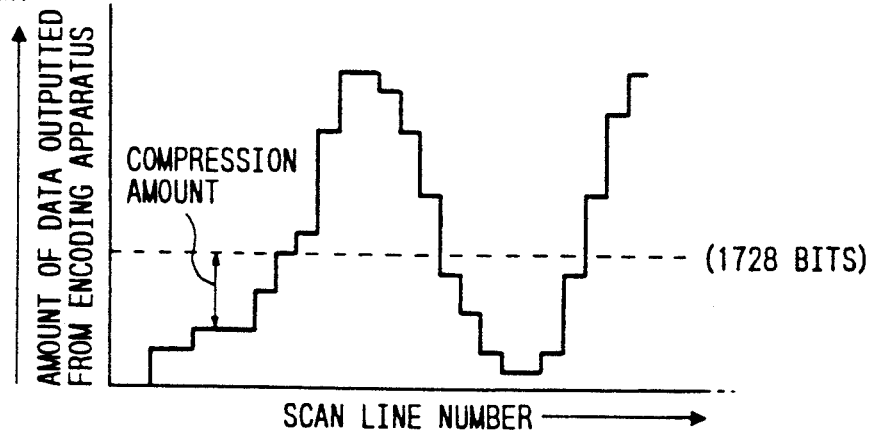

The advantages provided by the above embodiment will be described referring to diagrams FIGS. 5(A), 5(B) and 5(C). Of these, FIG. 5(A) is a graph showing how the amount of raw data (i.e. unencoded data) in each of successive scan lines of the image data is a constant, which in this example is 1728 bits. FIG. 5(B) shows an example of how the respective amounts of encoded data in successive scan lines, generated by a prior art image data encoding apparatus from the image data of FIG. 5(A), might vary. As shown, in the case of some of the scan lines, the prior art apparatus effectively achieves data compression, whereas for other scan lines (depending upon the image contents) a greater amount of encoded data is generated than the raw image data, i.e. the data amount of 1728 bits is exceeded in the encoded data, for some of the scan lines.

Figure 5C:
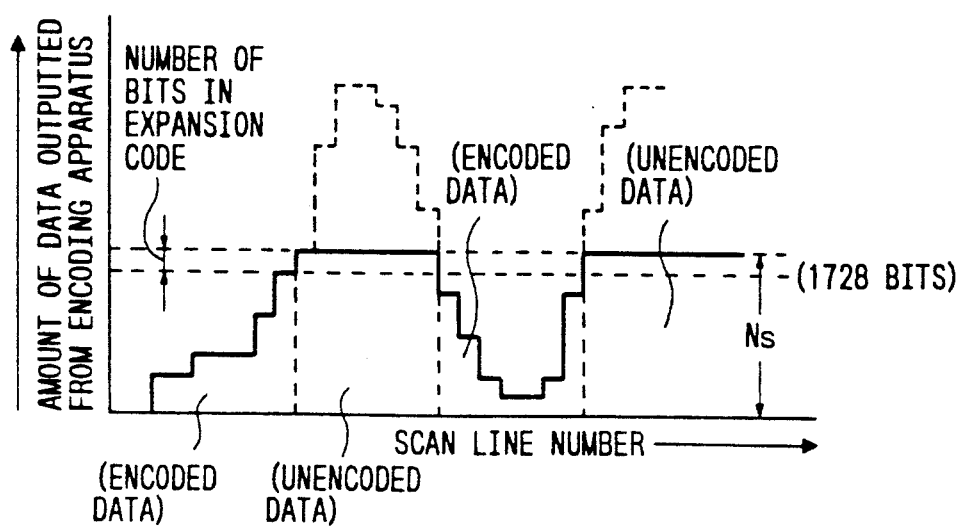

FIG. 5(C) shows the result that would be obtained in that case by using the embodiment of the present invention described above. In this case, irrespective of the image contents, the amount of data that is outputted from the image data encoding apparatus for each scan line cannot exceed a fixed maximum amount, which is the sum of the number of bits in each scan line of the unencoded data and the number of bits used for the expansion code $e_c$.

It can thus be understood that the present invention enables the advantages of a prior art type of image data encoding apparatus employing a variable length encoding technique to be maintained, while eliminating the disadvantage of increased amounts of encoded data being generated in the case of certain types of image content. Hence, more effective data compression can be achieved than has been possible in the prior art.

In the embodiment described above it is assumed that bi-level picture element data are encoded, i.e. that each picture element is a black or white dot expressable by one bit of image data. However the invention is not limited to such a type of data, and is equally applicable to compression of image data in which multi-bit data values express respective halftone gradation values or color values.

What is claimed is:

1. An image data encoding apparatus for encoding input image data derived by converting an image to successive picture element data values along each of successive scan lines, comprising:
    first memory means (1) for receiving and temporarily storing said input image data;
    encoding means (2) for receiving said input image data from said first memory means, and for converting said input image data to encoded data;
    second memory means (3) for receiving and temporarily storing said encoded data;
    data measurement means (4) for receiving said encoded data from said second memory means and for computing a total amount of said encoded data for each of said scan lines;
    comparator means (5) for comparing each of said total amounts of encoded data with a predetermined reference value, said reference value being determined in accordance with a total amount of said input image data in each of said scan lines; and
    output selector means (6) coupled to receive said input image data from said first memory means and said encoded data from said second memory means, and controlled by an output signal which is produced from said comparator means in accordance with results of said comparison, said output selector means selecting for each of said scan lines the encoded data for said scan line to be outputted therefrom if the total amount of said encoded data corresponding to said scan line does not exceed said reference value, and selecting the input image data for said scan line to be outputted therefrom if the total amount of said encoded data corresponding to said scan line does exceed said reference value.

2. An encoding apparatus according to claim 1, wherein said input image data represent halftone gradations.

3. An encoding apparatus according to claim 1, wherein said input image data represent color values.

4. An encoding apparatus according to claim 1, wherein said encoded data are derived using a Modified Huffman (MH) or Modified Read (MR) variable length encoding scheme.

5. An encoding apparatus according to claim 1, wherein said reference value is the sum of a total amount of input image data of each of said scan lines and an amount of data required to express an expansion code, said expansion code serving to identify each of said scan lines which is selected to be outputted from said output selector means in unencoded form.

6. An image data encoding apparatus for encoding input image data derived by converting an image to successive picture element data values along each of a plurality of successive scan lines wherein said input image data includes a fixed number of bits for each of said scan lines, comprising:
    memory means for receiving and temporarily storing said input image data;
    encoding means for receiving said input image data from said memory means, and for converting said input image data to encoded data;
    data measurement means for computing a total amount of said encoded data for each of said scan lines; and
    means for detecting, for each of said scan lines, a condition in which said amount of encoded data generated for said scan line exceeds an amount of said input image data of said scan line prior to conversion by said encoding means as expressed by said fixed number of bits, and for outputting said input image data of said scan line if said condition is detected.

7. An encoding apparatus according to claim 6, wherein said input image data represent halftone gradations.

8. An encoding apparatus according to claim 6, wherein said input image data represent color values.

9. An encoding apparatus according to claim 6, wherein said encoded data are derived using a Modified Huffman (MH) or Modified Read (MR) variable length encoding scheme.

* * * * *